United States Patent
Elenberg et al.

(10) Patent No.: US 11,941,358 B2
(45) Date of Patent: Mar. 26, 2024

(54) IDENTIFYING MESSAGES ENTERED INTO AN INCORRECT CONVERSATION

(71) Applicant: ASAPP, INC., New York, NY (US)

(72) Inventors: Ethan Russell Elenberg, Jersey City, NJ (US); Cosima Travis, Brooklyn, NY (US); Michael Griffiths, Brooklyn, NY (US); Kilian Quirin Weinberger, Ithaca, NY (US)

(73) Assignee: ASAPP, INC., New York, NY (US)

( * ) Notice: Subject to any disclaimer, the term of this patent is extended or adjusted under 35 U.S.C. 154(b) by 173 days.

(21) Appl. No.: 17/347,270

(22) Filed: Jun. 14, 2021

(65) Prior Publication Data
US 2022/0398380 A1 Dec. 15, 2022

(51) Int. Cl.
- *G06F 40/284* (2020.01)
- *G06F 40/30* (2020.01)
- *G06N 3/045* (2023.01)
- *H04L 51/046* (2022.01)
- *H04L 51/21* (2022.01)

(52) U.S. Cl.
CPC ........... *G06F 40/284* (2020.01); *G06N 3/045* (2023.01); *H04L 51/046* (2013.01)

(58) Field of Classification Search
CPC ...... G06F 40/279; G06F 40/30; G06F 40/274; G06F 40/284; G06N 3/044; G06N 20/00; H04L 51/063; H04L 51/21; H04L 51/212
USPC ....... 704/1, 9, 10; 706/30, 20; 707/748, 749; 715/710
See application file for complete search history.

(56) References Cited

U.S. PATENT DOCUMENTS

| | | | |
|---|---|---|---|
| 7,257,564 B2 * | 8/2007 | Loughmiller | H04L 51/212 709/206 |
| 8,250,158 B2 * | 8/2012 | Arnold | G06Q 10/107 709/206 |
| 9,805,371 B1 | 10/2017 | Sapoznik et al. | |
| 10,044,664 B2 * | 8/2018 | Dong | H04L 51/48 |
| 11,238,102 B1 * | 2/2022 | Lisuk | G06F 40/279 |
| 2007/0180028 A1 * | 8/2007 | Chen | G06Q 10/107 709/204 |

(Continued)

OTHER PUBLICATIONS

PCT/US2022/029405, "International Application Serial No. PCT/US2022/029405, International Search Report and Written Opinion dated Aug. 15, 2022", 17 pages.

*Primary Examiner* — Martin Lerner
(74) *Attorney, Agent, or Firm* — GTC Law Group PC & Affiliates

(57) ABSTRACT

A user using a messaging application may be in conversations with multiple people and may inadvertently send a message intended for a first person to a second person. The user may be warned before making such mistakes by processing the text of an entered message and/or the text of the conversations with a mathematical model. A match score may be computed that indicates the match between the entered message and the conversation in which it was entered. Where the match score indicates a possible mistake, a warning may be presented to the user. In some implementations, a match score may be computed using a conversation encoding vector and a message encoding vector. In some implementations, a match score may be computed by processing a sequence of tokens for the conversation and the entered message that includes special token separators.

20 Claims, 10 Drawing Sheets

(56) References Cited

U.S. PATENT DOCUMENTS

| | | | |
|---|---|---|---|
| 2009/0313343 A1* | 12/2009 | Brady | G06F 40/30 709/206 |
| 2010/0057874 A1* | 3/2010 | Cohen | H04L 51/212 709/206 |
| 2015/0358266 A1* | 12/2015 | Kaplinger | H04L 51/212 709/206 |
| 2016/0014151 A1 | 1/2016 | Prakash | |
| 2018/0048613 A1* | 2/2018 | Abou Mahmoud | H04L 51/23 |
| 2018/0075414 A1 | 3/2018 | Saito et al. | |
| 2018/0176168 A1* | 6/2018 | Tsou | G06F 21/6245 |
| 2018/0176173 A1* | 6/2018 | Keysers | G06N 20/00 |
| 2020/0019609 A1 | 1/2020 | Yu et al. | |
| 2020/0168210 A1* | 5/2020 | Seo | G06F 40/30 |
| 2021/0034929 A1* | 2/2021 | Zilberman | G06V 40/173 |
| 2021/0044547 A1 | 2/2021 | Bradley et al. | |
| 2022/0293094 A1* | 9/2022 | Mao | G06F 40/35 |

\* cited by examiner

Fig. 2

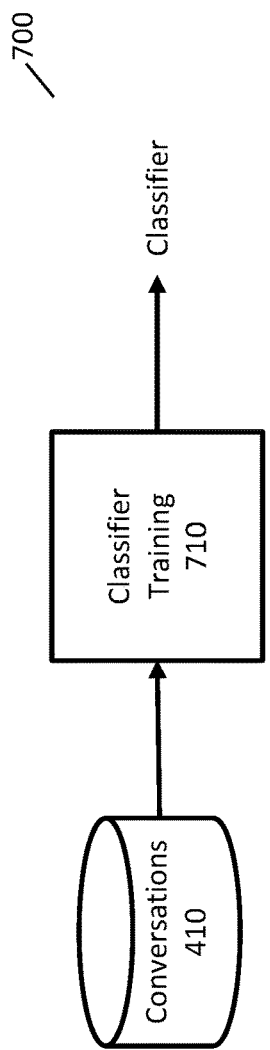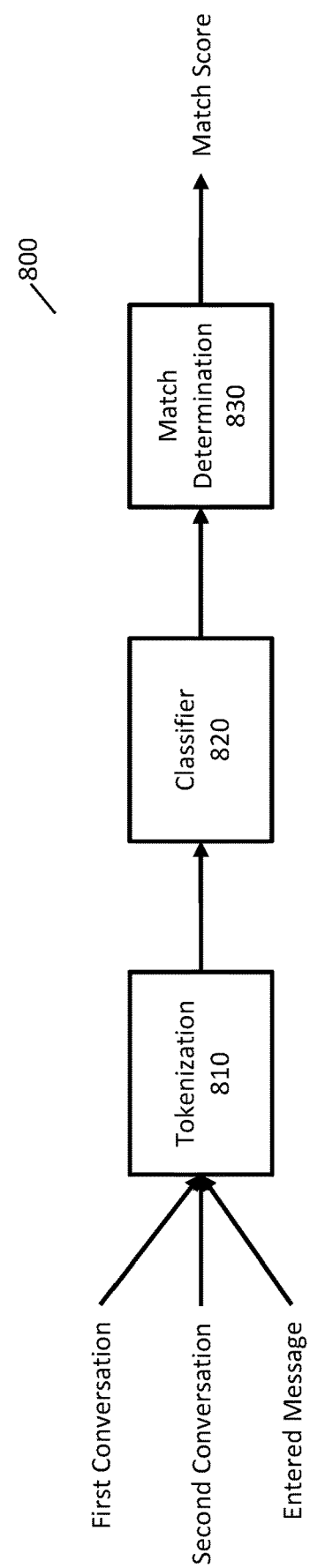

US 11,941,358 B2

IDENTIFYING MESSAGES ENTERED INTO AN INCORRECT CONVERSATION

BACKGROUND

Mathematical models and natural language processing may provide advanced features to enhance applications, such as a messaging system that allows users to send messages to each other.

A user of a messaging system may be involved in multiple conversations with different people. The user may accidentally send a message to a first person that was intended for a second person. In some instances, sending a message to the wrong person may have undesirable consequences, such as embarrassment or inadvertent disclosure of confidential or sensitive information.

It may be desired to improve a messaging system to use natural language processing to prevent messages from being sent to the wrong people.

BRIEF DESCRIPTION OF THE FIGURES

The invention and the following detailed description of certain embodiments thereof may be understood by reference to the following figures:

FIG. 2 is an example user interface for a messaging application where a user may have conversations with multiple people.

FIG. 7 is an example system that may be used to generate a classifier for determining when a message has likely been entered in an incorrect conversation.

FIG. 8 is an example conversation correction system implemented by converting text inputs into a sequence of tokens.

DETAILED DESCRIPTION

People may exchange messages with each other using a variety of techniques and in a variety of situations. For example, a person may type or speak a message to an app running on a device, type or speak a message on a web page, send a text message, or send an email. As used herein, a text message includes any message sent as text including but not limited to a message sent using SMS (short message service) or a special-purpose application (e.g., Facebook messenger, Apple iMessage, Google Hangouts, or WhatsApp). People may exchange messages for any appropriate purpose, such as social interactions, business interactions, or to request customer support from a company. The techniques described herein are not limited to any manner of or purpose for exchanging messages.

A messaging system or application may allow a user to have multiple conversations with different people. The user may send a first message in a first conversation to a first person and may then send a second message in a second conversation to a second person. For example, nearly all smart phones have applications (or "apps") that allow a user to have multiple conversations with different people. Another scenario where a user may use a messaging system to have conversations with multiple people is a customer service agent who provides customer support to multiple customers of a company.

The user interface of a messaging application may allow a user to easily switch between different conversations. The ease of switching between conversations may also allow a user to send a message in a wrong, incorrect, or unintended conversation. In some instances, sending a message in an incorrect conversation may cause confusion or humor, but in some instances, sending a message in an incorrect conversation may cause greater harm, such as embarrassment, causing offense, or inadvertently disclosing confidential or sensitive information.

A messaging application may be updated to warn a user if it is likely that a user may be sending a message in an incorrect conversation. For example, if a user enters "Hi John" in a conversation with Alice, it may be likely that the user is sending the message in an incorrect conversation.

Figure 1:
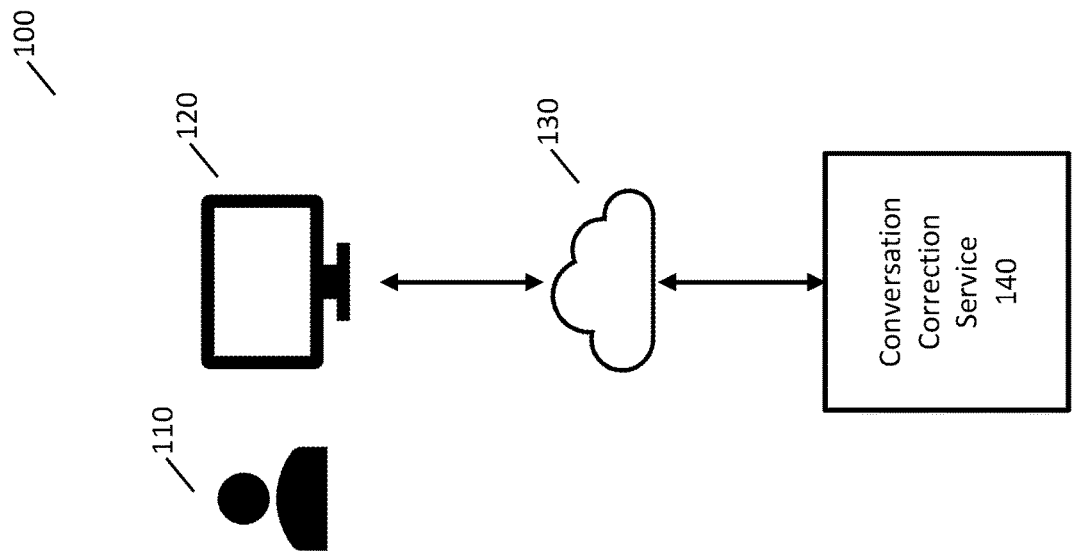
FIG. 1 is an example system for allowing a user to use a conversation correction service when using a messaging application to send messages to other people.

FIG. 1 is an example system 100 for allowing a user to use a conversation correction service when using a messaging application to send messages to other people. In FIG. 1, user 110 may use user device 120 to communicate with one or more other users not shown in FIG. 1. User device 120 may be any appropriate device, such as a computer or a mobile phone. User 110 may be using any appropriate application that allows accessing received messages and transmitting messages to other users.

User device 120 may have access to conversation correction service 140 to assist user 110 in avoiding sending messages in incorrect conversations. In some implementations, conversation correction service 140 may be implemented within user device 120. In some implementations, user device 120 will access conversation correction service 140 via a network, such as network 130. Network 130 may include any appropriate network, such as the Internet or a mobile data network.

Conversation correction service 140 may process a message entered by a user in a conversation and messages of one or more conversations to determine if the user may have entered the message in an incorrect conversation, and if such a determination is made, to warn the user. Conversation correction service 140 may use any appropriate techniques, such as any of the techniques described herein.

Figure 2:
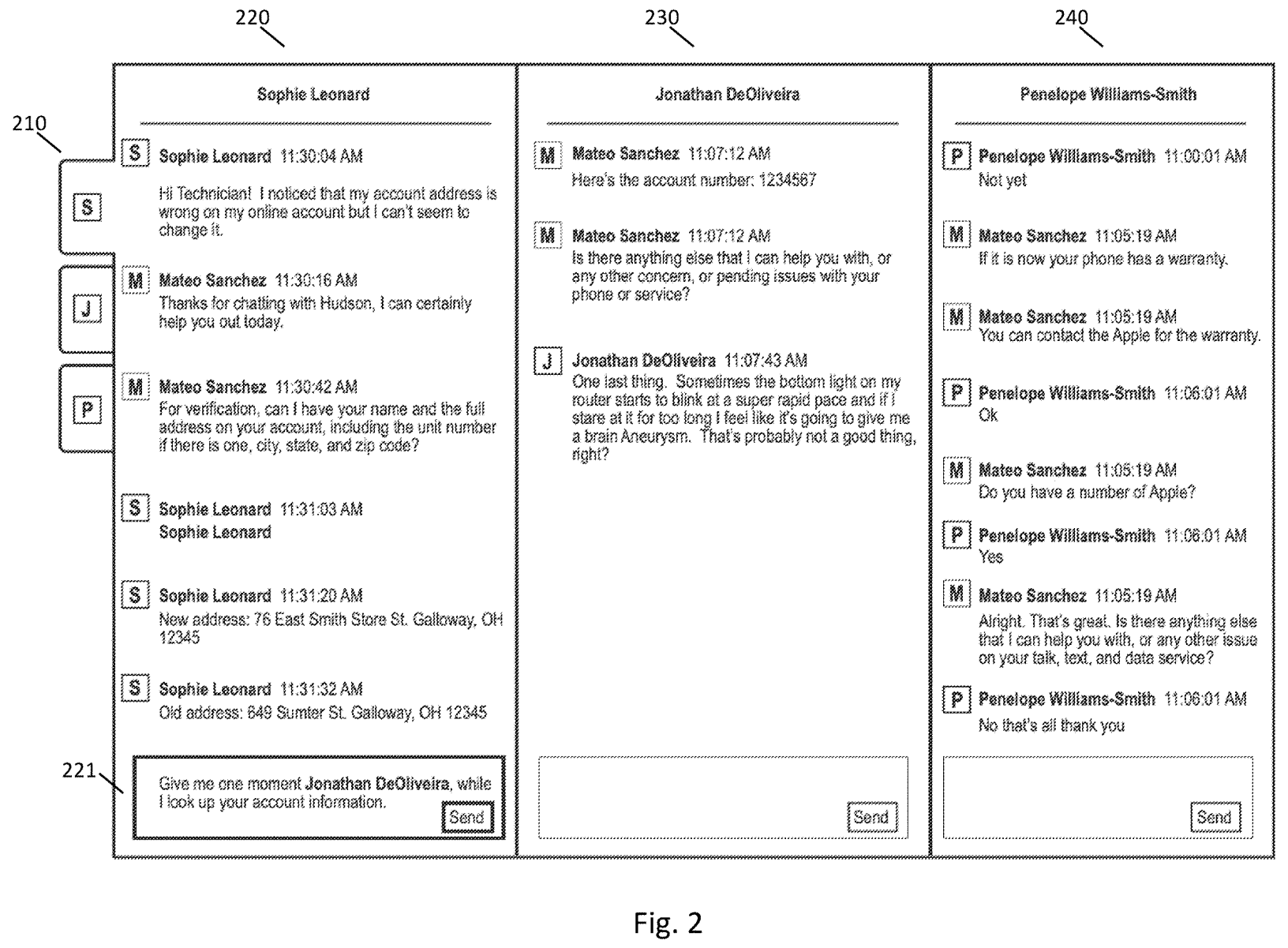

FIG. 2 is an example user interface for a messaging application where a user may have conversations with multiple people. The user interface of FIG. 2 is not limiting and any appropriate user interface may be used. A user interface may have a conversation selector portion 210. In conversation selector portion 210, a user may cause different conversations to be shown or hidden in the user interface.

In some implementations, a messaging application, such as the example of FIG. 2, may allow the user to view multiple conversations simultaneously. In some implementations, the user may be able to view only one conversation at a time. In FIG. 2, the user is having a first conversation with a first user in first conversation portion 220, is having a second conversation with a second user in second conversation portion 230, and is having a third conversation with a third user in third conversation portion 240. As illustrated in FIG. 2, the user may view sent and received messages in each conversation.

A messaging application may have a message input field to allow a user to enter a message. A message may be entered using any appropriate techniques, such as typing on a keyboard or using speech recognition. In the example of FIG. 2, each conversation portion has a message input field to allow the user to send a message in the corresponding conversation.

In FIG. 2, the user has entered a message for the first conversation in message input field 221. The messaging application may process the entered message and the messages of one or more of the conversations to determine a match score that indicates the match between the entered message and the first conversation. The match score may be computed at any appropriate time. For example, the match score may be computed and updated as the user is entering the message or the match score may be computed when the user attempts to send the message.

In the example of FIG. 2, the user is sending a message to Sophie that includes the name Jonathan and the adjacent conversation is with Jonathan. Accordingly, it seems likely that the user entered this message in an incorrect conversation.

Figure 3:
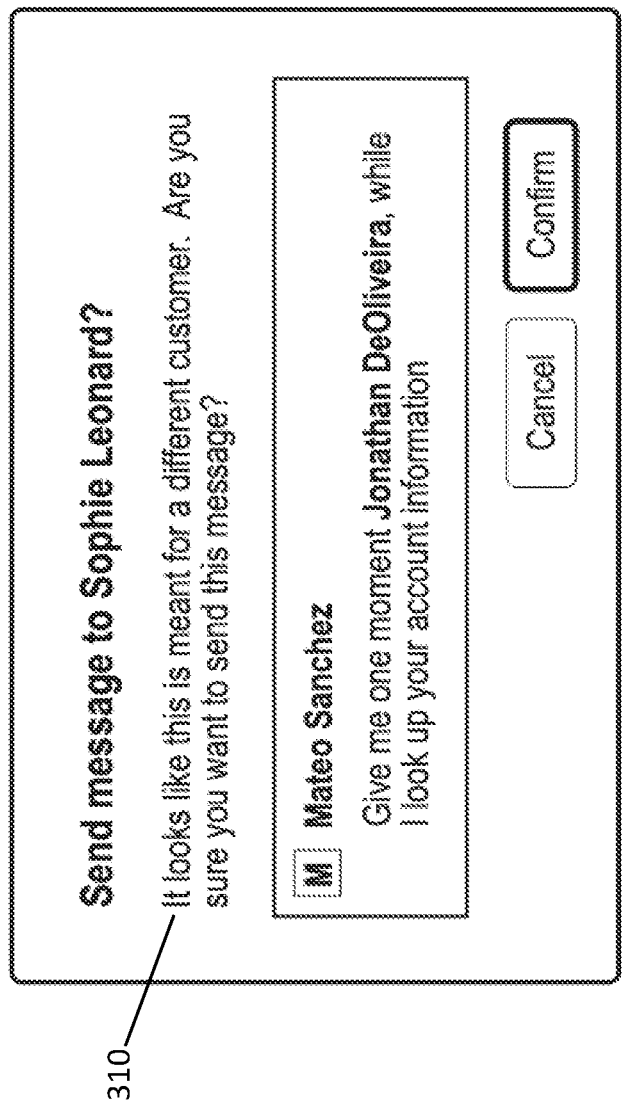
FIG. 3 is an example user interface for a messaging application showing a warning to inform the user that he or she may have entered a message in an incorrect conversation.

FIG. 3 is an example user interface for a messaging application showing a warning 310 to inform the user that he or she may have entered a message in an incorrect conversation. In this example, a dialog window is shown containing the warning, but the warning may be presented using any appropriate techniques. In this example, the warning shows the message entered by the user and includes an explanation by emphasizing the apparently incorrect name in the message.

The user may select "Cancel" to heed the warning, not send the message, and instead send the message in a different conversation. Alternatively, where the warning is a false alarm, the user may select "Confirm" to proceed to send the message in the conversation in which it was entered.

A messaging application may use mathematical models, such as neural networks, and natural language processing to determine when a message has likely been entered in an incorrect conversation. Now described are example implementations of such a messaging application.

Figure 4:
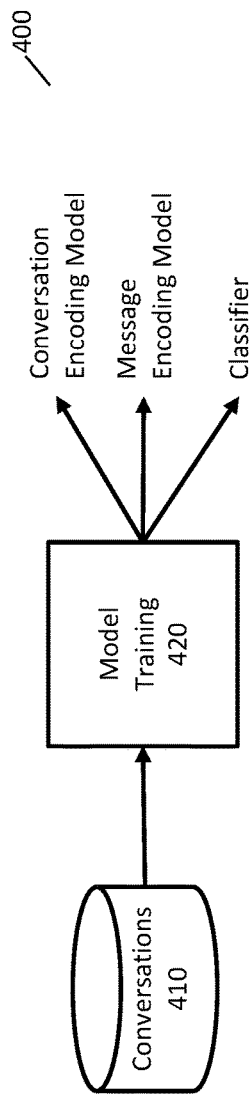
FIG. 4 is an example system that may be used to generate mathematical models for determining when a message has likely been entered in an incorrect conversation.

FIG. 4 is an example system 400 that may be used to generate mathematical models for determining when a message has likely been entered in an incorrect conversation. The mathematical models may include one or more of (i) a conversation encoding model that may process messages of a conversation to compute a conversation encoding vector for the conversation, (ii) a message encoding model that may process an entered message to compute a message encoding vector for the entered message, or (iii) a classifier that computes classification scores indicating a match between an entered message and two or more conversations.

In FIG. 4, model training component 420 implements a training process to train parameters of one or more mathematical models. This training process uses a training corpus of conversations, such as conversations stored in conversations data store 410. Model training component 420 may be implemented using any appropriate techniques. For example, model training component 420 may train mathematical models using stochastic gradient descent.

Figure 5:
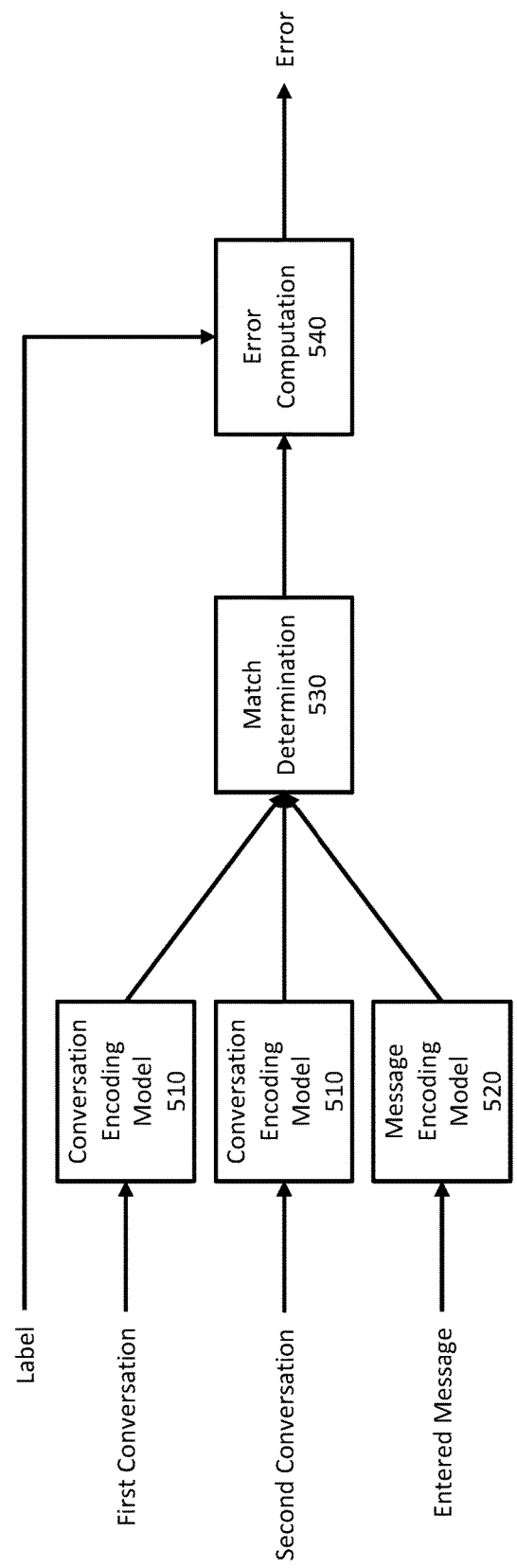
FIG. 5 illustrates components of an example implementation of a model training component.

FIG. 5 illustrates components of an example implementation of model training component 420. FIG. 5 includes conversation encoding model 510 that processes text of a conversation to compute a conversation encoding vector that represents the meaning of the conversation. FIG. 5 also includes message encoding model 520 that processes text of a message to compute a message encoding vector that represents the meaning of the message. Conversation encoding model 510 and message encoding model 520 may be implemented using any appropriate techniques. In some implementations, they may be implemented using neural networks, such as a recurrent neural network or a transformer neural network (e.g., BERT or GPT).

Conversation encoding model 510 and message encoding model 520 may be implemented using different techniques (e.g., different neural network architectures) and/or different parameters. The different implementations of conversation encoding model 510 and message encoding model 520 may account for differences in the data being processed (conversation versus a message) and also for the relationship between the data being processed (e.g., that the message is a next message in a conversation).

In FIG. 5, only two conversations are shown, but any number of conversations may be used and additional instances of conversation encoding model 510 may be added for other conversations. The label may be used to indicate whether the entered message was entered into the correct conversation or mistakenly entered into an incorrect conversation.

Match determination component 530 may process the input conversation encoding vectors and message encoding vector and determine a match score indicating a likelihood that message was entered in the correct conversation (or, conversely, a mistake score indicating a likelihood that message was entered in an incorrect conversation). Match determination component 530 may be implemented using any appropriate techniques.

In some implementations, match determination component 530 may compute a conversation match score for each conversation. For example, a first conversation match score for the first conversation may be computed by computing an inner product between the message encoding vector and the first conversation encoding vector for the first conversation. The first conversation match score may indicate how well the entered message matches the messages of the first conversation. An overall match score may be computed from the conversation match scores using any appropriate techniques. For example, the overall match score may be any of the following: the first conversation match score (the conversation match score for the conversation where the message was entered); the first conversation match score minus the second conversation match score (with more than two conversations, this may be generalized to the first conversation match score minus the largest of the other conversation match scores or the smallest difference); the first conversation match score divided by the second conversation match score (with more than two conversations, this may be generalized to the first conversation match score divided by the largest of the other conversation match scores or the smallest ratio).

In some implementations, match determination component 530 may be implemented using a classifier. The classifier may process the conversation encoding vectors for each of the conversations and the message encoding vector to compute a vector of classification scores with a length of the number of conversations. Each element of the classification scores vector may indicate a match between the entered message and the corresponding conversation. An overall match score may be computed from classification scores as described above. A classifier may be implemented using any appropriate techniques, such as using one or more fully connected neural network layers.

Error computation component 540 may receive the match score (e.g., an overall match score) from match determination component 530 and a label indicating whether the entered message was entered in the correct conversation or an incorrect conversation. Error computation component 540 may compute an error value using these inputs. For example, the match score may be a value between 0 and 1 where 1 corresponds to a match and 0 corresponds to a mistake. The label may be 1 or 0 for no mistake and a mistake, respectively. In some implementations, error computation component 540 may compute the error as a difference between the match score and the label.

During a training process, model training component 420 may iterate over conversations in conversations data store 410 to train parameters of conversation encoding model 510, message encoding model 520, and match determination component 530. A pair of conversations may be selected, and one or more initial messages of each conversation may be the conversation inputs to the corresponding conversation encoding models 510. A subsequent message of a first conversation may be input to message encoding model 520 as a next entered message. The label may be set to 1 to indicate no mistake. An error may be computed, and the error may be used to update the model parameters.

This process may be repeated by using additional messages of the pair of conversations as the input to the corresponding conversation encoding models 510. A subsequent message of the first conversation may be input to message encoding model 520, and so forth. This process may also be repeated using other pairs of conversations in conversations data store 410.

In some implementations, the training process may also use negative examples. Instead of using the actual next message in the first conversation as the input to message encoding model 520, a different message may be selected that is known to be a poor match for the conversation or is likely to be a bad match for the conversation (e.g., a randomly selected message or the subsequent message for the second conversation). For the negative examples, the label may be set to 0 to indicate a mistake.

After performing the training process, model training component 420 may output mathematical models to be used in a production system.

Figure 6:
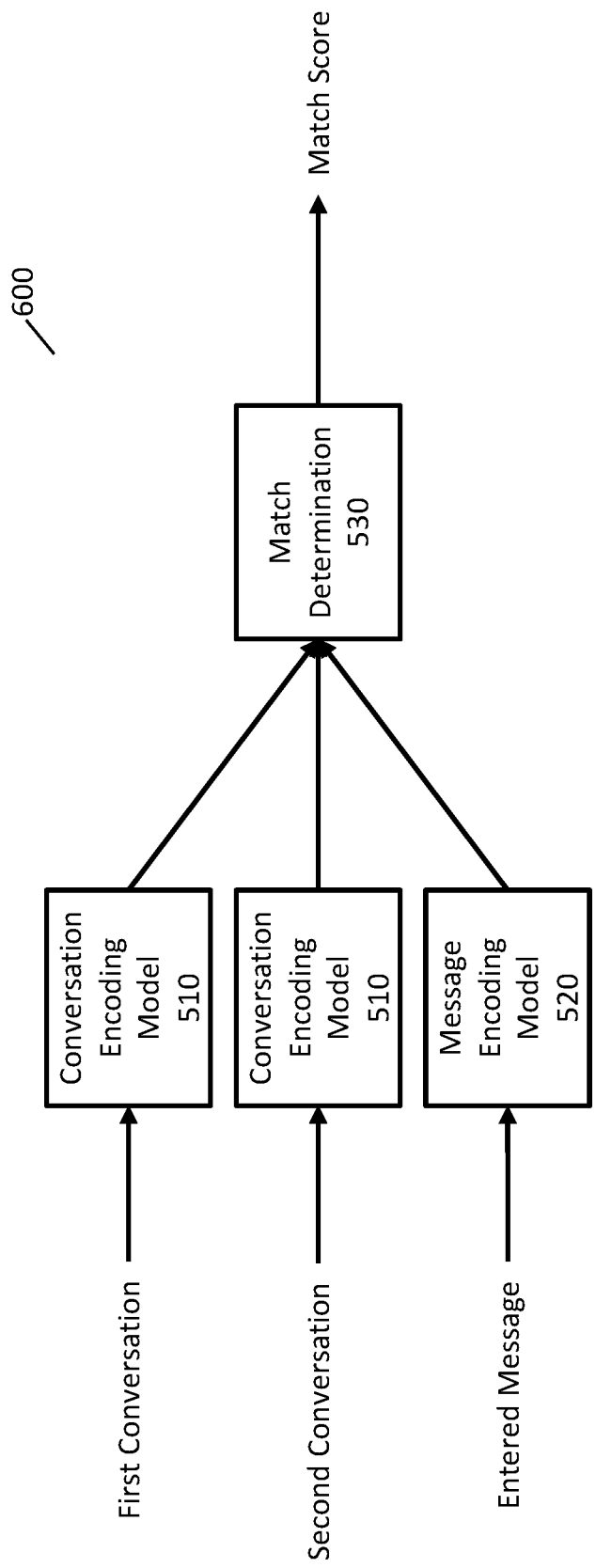
FIG. 6 is an example conversation correction system implemented using a conversation encoding model and a message encoding model.

FIG. 6 is an example conversation correction system 600 implemented using a conversation encoding model and a message encoding model. Conversation correction system 600 may be used when a user is having conversations with multiple people. For example, each time the user enters a new message in a conversation, conversation correction system 600 may be used to process the entered message and warn the user if the message may have been entered in an incorrect conversation.

In FIG. 6, text of messages of a first conversation may be input to a first instance of conversation encoding model 510 to compute a first conversation encoding vector that represents the first conversation. Similarly, text of messages of a second conversation may be input to a second instance of conversation encoding model 510 to compute a second conversation encoding vector that represents the second conversation. This may be repeated for other conversations as needed. When the user enters a message in a conversation, text of the message may be input to message encoding model 520 to compute a message encoding vector.

Match determination component 530 processes the first and second conversation encoding vectors (and possibly other conversation encoding vectors) and the message encoding vector to compute a match score that indicates a likelihood that the user entered the message in the correct conversation. Match determination component 530 may be implemented using any appropriate techniques, such as a classifier or by computing inner products as described above. The match score may be compared to a threshold, and where the match score is below a threshold, a warning may be presented to the user, such as the warning shown in FIG. 3.

In some implementations, a conversation correction application may be implemented with other mathematical models than described above. For example, a conversation correction application may be implemented without using the conversation or message encoders described above.

FIG. 7 is an example system 700 that may be used to generate a classifier for determining when a message has likely been entered in an incorrect conversation. The classifier may be implemented using any appropriate neural network, such as a recurrent neural network or a transformer neural network (e.g., BERT or GPT).

In FIG. 7, classifier training component 710 implements a training process to train parameters of a classifier, such as a classifier implemented using a neural network. In some implementations, the inputs to the classifier may be combined into a single sequence of tokens with special tokens to indicate the different inputs. For example, an initial token may be the special token "[CONV1]" to indicate that the next tokens correspond to the first conversation. The text of the first conversation (and other text) may be converted to tokens using any appropriate techniques (e.g., word-piece encodings or byte-pair encodings). After the tokens of the first conversation, the next token may be the special token "[CONV2]" to indicate that the next tokens correspond to the second conversation. After the tokens of the second conversation, the next token may be the special token "[MSG]" to indicate that the next tokens correspond to a message entered by the user. After the tokens of the message entered by the user, the next token may be the special token "[END]" to indicate the end of all tokens. The foregoing special tokens are just examples, and any appropriate special tokens may be used.

Classifier training component 710 may train the parameters of the classifier using similar training techniques as described above. At each training iteration, messages of two more conversations and an entered message may be converted into a sequence of tokens using special tokens as separators. The sequence of tokens may be processed by the classifier to generate a vector of classification scores, and a match score may be computed from the classification scores. An error may be computed using the match score and a label, and the parameters of the classifier may be updated using the error.

After performing the training process, classifier training component 710 may output a classifier to be used in a production system.

FIG. 8 is an example conversation correction system 800 implemented by converting text inputs into a sequence of tokens. Conversation correction system 800 may be used when a user is having conversations with multiple people. For example, each time the user enters a new message in a conversation, conversation correction system 800 may be used to process the entered message and warn the user if the message may have been entered in an incorrect conversation.

In FIG. 8, text of messages of a first conversation, text of messages of a second conversation, and text of a message entered by the user (and possibly text of messages of other conversations) are input into tokenization component 810. Tokenization component 810 creates a sequence of tokens by combining the tokens of the inputs with special tokens, such as the special tokens described above.

Classifier component 820 processes the sequence of tokens received from tokenization component 810 and computes a vector of classification scores. Classifier component 820 may be implemented using any appropriate techniques, such as a recurrent neural network, a transformer neural network, or one or more fully connected neural network layers.

Match determination component 830 processes the classification scores to compute a match score. Match determination component 830 may be implemented using any appropriate techniques, such as any of the techniques described above for match determination component 530. The match score may be compared to a threshold, and where the match score is below a threshold, a warning may be presented to the user, such as the warning shown in FIG. 3.

In some implementations, it may be desired to evaluate the harm caused by a message sent in an incorrect conversation. For example, if the user entered the message "How can I help you today?" in an incorrect conversation, the harm may be minimal as a minor embarrassment or awkwardness. However, if the user disclosed confidential or sensitive information in an incorrect conversation (e.g., a credit card number or social security number), then the harm could be much greater.

To estimate the cost of entering a message in an incorrect conversation, a separate mathematical model may be constructed for that purpose, and this model may be referred to as a cost model. A cost model may process text of an entered message and/or text of messages of one or more conversations to compute a cost score that indicates the harm from entering the message in an incorrect conversation.

A cost model may be trained using a training corpus of conversations where messages of the conversations have been labelled to indicate the harm of entering the message in an incorrect conversation. The training corpus may be labelled using any appropriate techniques, such as human annotation or automated processing that adds a label based on the presence of confidential information, sensitive information, or personally identifiable information (e.g., using regular expressions or named entity recognition).

A cost model may be implemented using any of the techniques described herein. In some implementations, a cost model may process only the text of the message entered by a user. In some implementations, a cost model may process the text of the message entered by a user and the text of the conversation in which the message was entered. In some implementations, a cost model may process the text of the message entered by a user and the text of two or more conversations. In the examples below, the cost model processes the text of two or more conversations, and other variations are straightforward to one of skill in the art.

Figure 9:
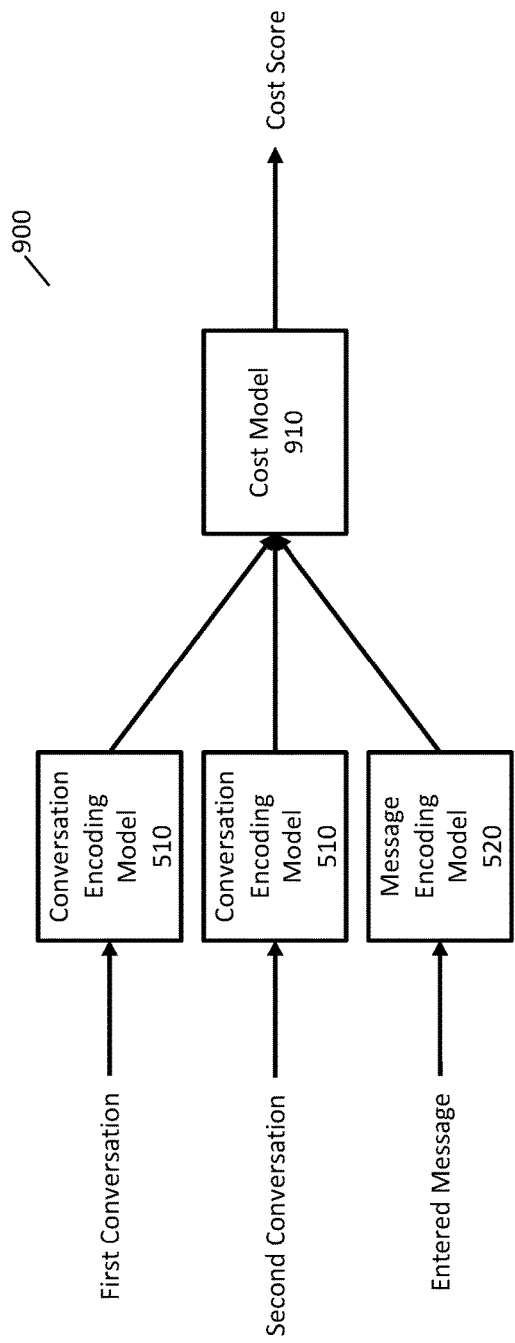
FIG. 9 is an example system for implementing a cost model using a conversation encoding model and a message encoding model.

FIG. 9 is an example system 900 for implementing a cost model using a conversation encoding model and a message encoding model. In FIG. 9, the first and second conversation encodings and the message encoding are computed as described herein. Cost model 910 processes the first and second conversation encodings and the message encoding to compute a cost score that indicates harm from entering the message in an incorrect conversation. Cost model 910 may be implemented using any appropriate mathematical model, such as any of the neural networks described herein.

Figure 10:
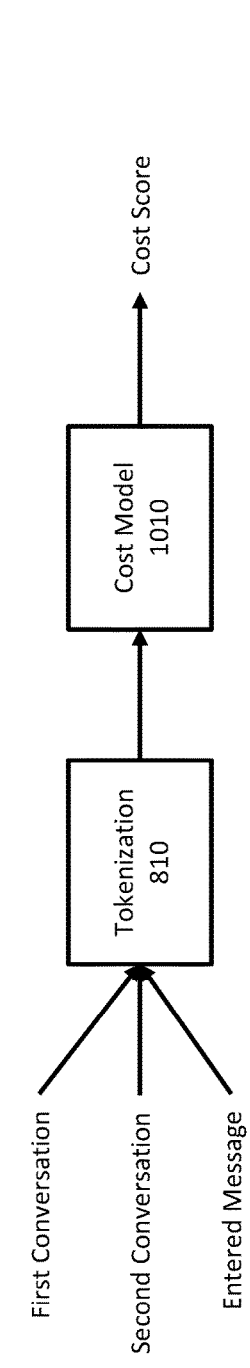
FIG. 10 is an example system for implementing a cost model by converting text inputs into a sequence of tokens.

FIG. 10 is an example system 1000 for implementing a cost model implemented by converting text inputs into a sequence of tokens. In FIG. 10, tokenization component 810 creates a sequence of tokens from the first and second conversation and the entered message as described above. Cost model 1010 processes the sequence of tokens to compute a cost score that indicates harm from entering the message in an incorrect conversation. Cost model 1010 may be implemented using any appropriate mathematical model, such as any of the neural networks described herein.

In some implementations, a cost score may be used along with a match score to determine whether to warn the user of the possibility of the message being entered in an incorrect conversation. For example, where the cost score is high, a threshold for the match score may be lowered to prevent a possibly costly mistake. For another example, where the cost score is low, a threshold for the match score may be increased to reduce the incidence of false alarms.

In some implementations, a two-dimensional threshold on the match score and the cost score may be used to determine whether to warn the user. A two-dimensional threshold may be implemented using any appropriate techniques. For example, it may be implemented as a function of the match score and the cost score. For another example, it may be implemented as piecewise linear threshold that varies over values of the match score or the cost score.

In some implementations, the cost score may be used to determine how to warn the user. For a lower cost score, the warning may be less intrusive, such as a small icon presented next to the entered message. For a higher cost score, the warning may be more intrusive, such as a dialog window that requires the user to confirm that the message was entered in a correct conversation.

In some implementations, a cost score may be used both for determining whether to warn the user and how to warn the user.

In some implementations, additional information may be used in computing the match score and/or the cost score. The additional information may be processed to compute additional features that may be processed by any of the models described herein.

In some implementations, the presence of specific words or phrases may be used in computing a match score or a cost score. The specific words or phrases may include, for example, profanity, words relating to confidential or sensitive information (e.g., "credit card" or "social security"), or proper nouns (e.g., the names of people in the conversations). The presence of the specific words or phrases may be converted into features using any appropriate techniques, such one-hot vectors, embeddings, tokens, or hash values.

In some implementations, one or more natural language intents of messages in conversations may be used in computing a match score or a cost score. A natural language intent may be computed for a message or for a conversation using any appropriate techniques, such as any of the neural networks described herein. The natural language intent may be represented as a vector that may be used as a feature.

In some implementations, the presence of named entities as determined by named entity recognition may be used in computing a match score or a cost score. For example, named entity recognition may identify text corresponding to proper nouns in a message. The named entities may be converted into features using any appropriate techniques, such one-hot vectors, embeddings, tokens, or hash values.

In some implementations, non-text features may be used in computing a match score or a cost score. Examples of non-text features may include the following: a number of messages in a conversation; a number of consecutive messages by a person in a conversation; an attribute of a person in the conversation (e.g., age, gender, employee seniority level, or employee experience level); the duration of a conversation; or the amount of time since a most recent message in a conversation.

One or more of the above features may be used as inputs to any of the models described above (either during training or during use of the model in a production system), such as a conversation encoding model, a message encoding model, a match determination component, a cost model, or a classifier. The use of additional features may allow the models to provide more accurate results than without the additional features.

In some implementations, the warning presented to the user may include an explanation of why the warning is being presented. The explanation may be presented to the user using any appropriate techniques, such as one or more of the following: presenting a dialog box; presenting a text explanation (e.g., explaining that it appears that the message is using an incorrect name of the recipient); presenting text of the entered message and annotating words or phrases relating to the mistake (e.g., emphasizing an incorrect name as shown in FIG. 3).

In some implementations, an explanation may be determined by comparing words or phrases of the entered message with words or phrases of the conversations. If a word or phrase is entered as part of a message in a first conversation and that word or phrase is also used in a different conversation, then that word or phrase may be used as part of generating the explanation. In some implementations, language model scores may be used so that common words or phrases are not used to generate explanations.

In some implementations, an explanation may be determined using mathematical models. For example, in some implementations, self or cross attention masks of a neural network may indicate that similar words or phrases were used between an entered message and a different conversation. A word or phrase with a high self or cross attention mask in a different conversation may be used to generate the explanation.

Figure 11:
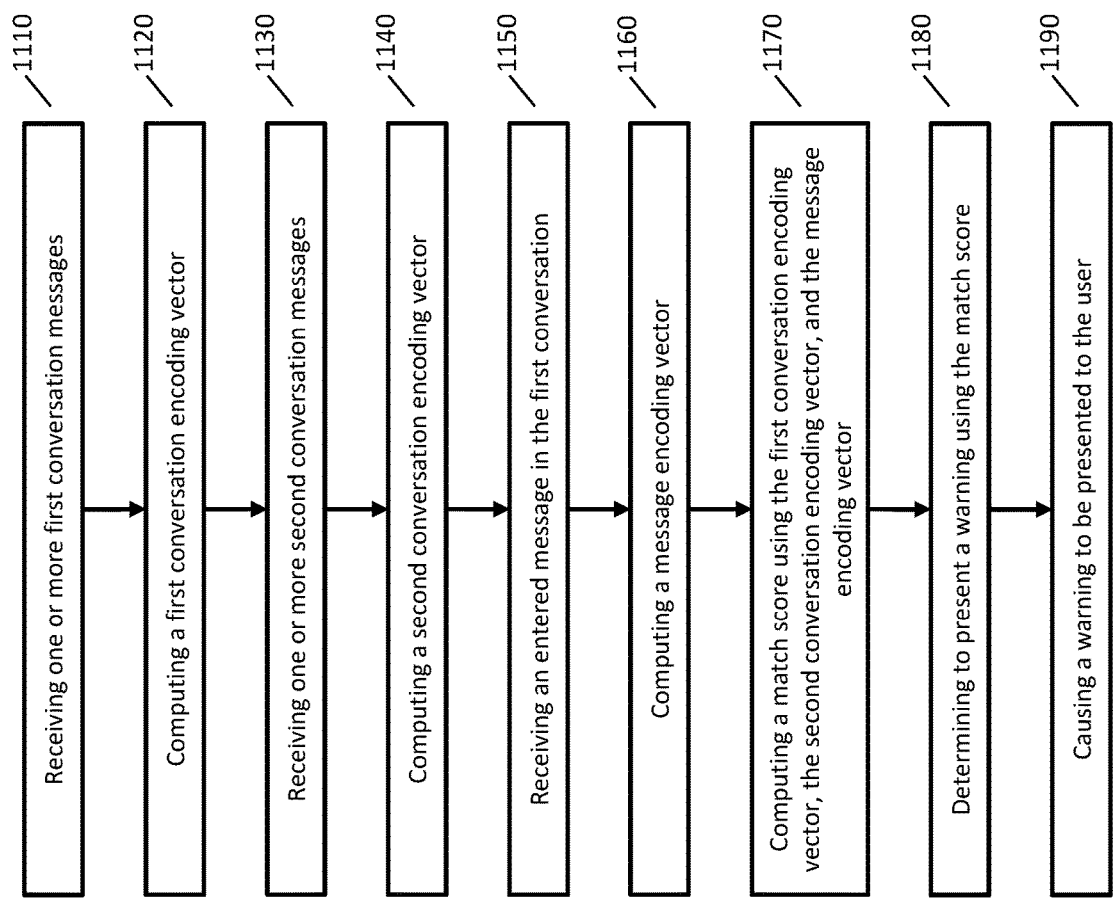
FIG. 11 is a flowchart of an example method for implementing a conversation correction system using a conversation encoding model and a message encoding model.

FIG. 11 is a flowchart of an example method for implementing a conversation correction system using a conversation encoding model and a message encoding model.

In the steps below a user is having a first conversation with a first person and a second conversation with a second person, but the method is not limited to two conversations and any number of conversations may be used. The messages in the conversations may be received using any appropriate techniques and for any type of conversation (e.g., a customer support session between a customer and a customer support agent). In some implementations, the messages may be received using an API call.

At step 1110, one or more first conversation message are received where the first conversation is between a user and a first person.

At step 1120, a first conversation encoding vector is computed by processing the one or more first conversation messages with a mathematical model, such as a neural network. In some implementations, the first conversation encoding vector is computed using a conversation encoding model.

At step 1130, one or more second conversation message are received where the second conversation is between the user and a second person.

At step 1140, a second conversation encoding vector is computed by processing the one or more second conversation messages with the mathematical model.

At step 1150, an entered message is received where the entered message was entered in the first conversation by the user.

At step 1160, a message encoding vector is computed by processing the entered message with a mathematical model, such as a neural network. The mathematical model for computing the message encoding vector may be the same mathematical model as used for computing the conversation encoding vector or a different mathematical model. In some implementations, the message encoding vector is computed using a message encoding model.

At step 1170, a match score is computed using one or more of the first conversation encoding vector, the second conversation encoding vector, and the message encoding vector. In some implementations, non-text features may be used to compute the match score. The match score may be computed using any of the techniques described herein.

At step 1180, it is determined to present a warning to the user using the match score. Any appropriate techniques may be used, such as comparing the match score to a threshold. In some implementations, a cost score may also be used to determine to present a warning to the user, such as by comparing the match score and the cost score to a two-dimensional threshold.

At step 1190, an action is performed to cause a warning to be presented to the user. Any appropriate techniques may be used to cause the warning to be presented. For example, an API call may be performed to cause the warning to be presented in a messaging application. In some implementations, a cost score may be used to determine how to present the warning to the user, such as by selecting a warning presentation option (e.g., a dialog box).

Figure 12:
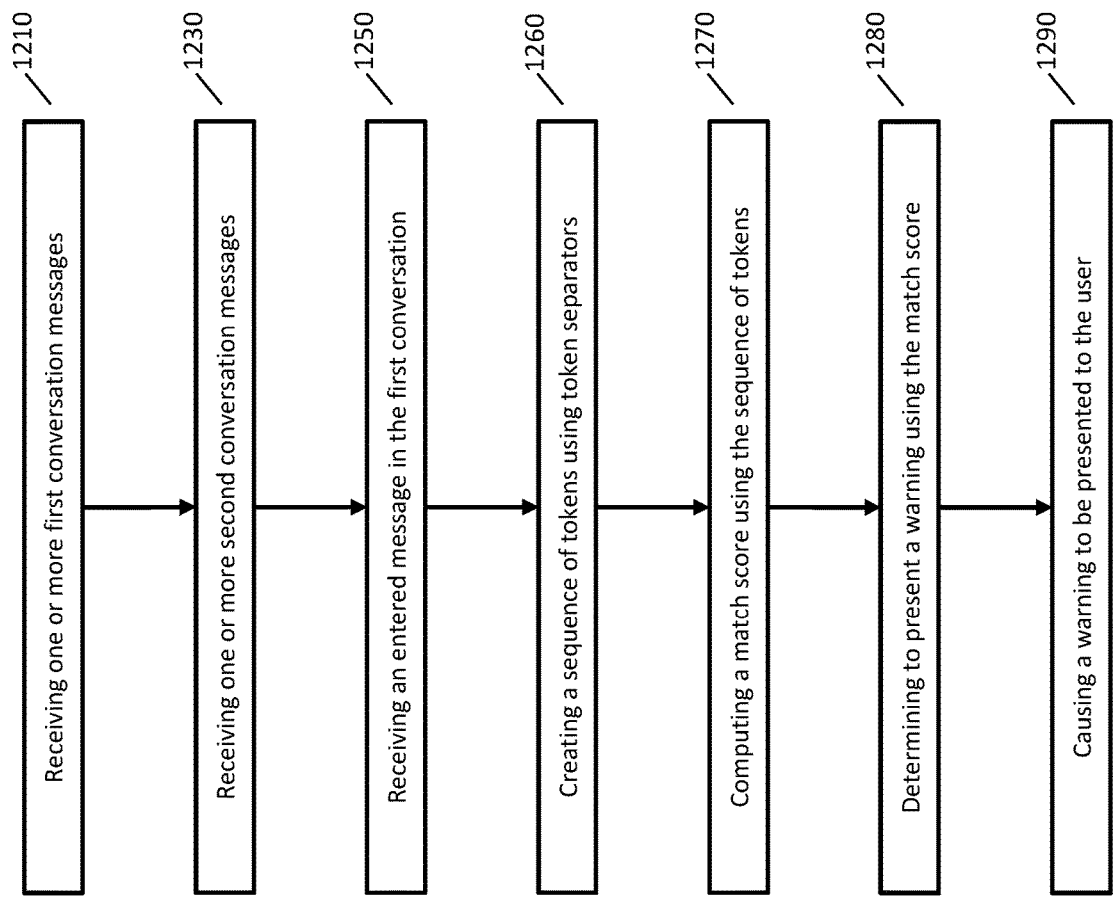
FIG. 12 is a flowchart of an example method for implementing a conversation correction system by converting text inputs into a sequence of tokens.

FIG. 12 is a flowchart of an example method for implementing a conversation correction system by converting text inputs into a sequence of tokens. In FIG. 12, steps 1210, 1230, 1250, 1280, and 1290 may be performed in a similar manner as for the corresponding steps described in FIG. 11.

At step 1260, a sequence of tokens may be created for the one or more first conversation messages, one or more second conversation messages, and the entered message using token separators, such as the special tokens described above. Any appropriate tokenization techniques may be used. In some implementations, a single sequence of tokens may be created by combining tokens of the one or more first conversation messages, a token indicating the end of the one or more first conversation messages, tokens of the one or more second conversation messages, a token indicating the end of the one or more second conversation messages, and tokens of the entered message.

At step 1270, a match score is computed by processing the sequence of tokens. In some implementations, the sequence of tokens may be processed by a classifier, such as a neural network classifier, to compute classification scores. A match score may then be computed using the classification scores. The match score may then be used as described in FIG. 11.

Figure 13:
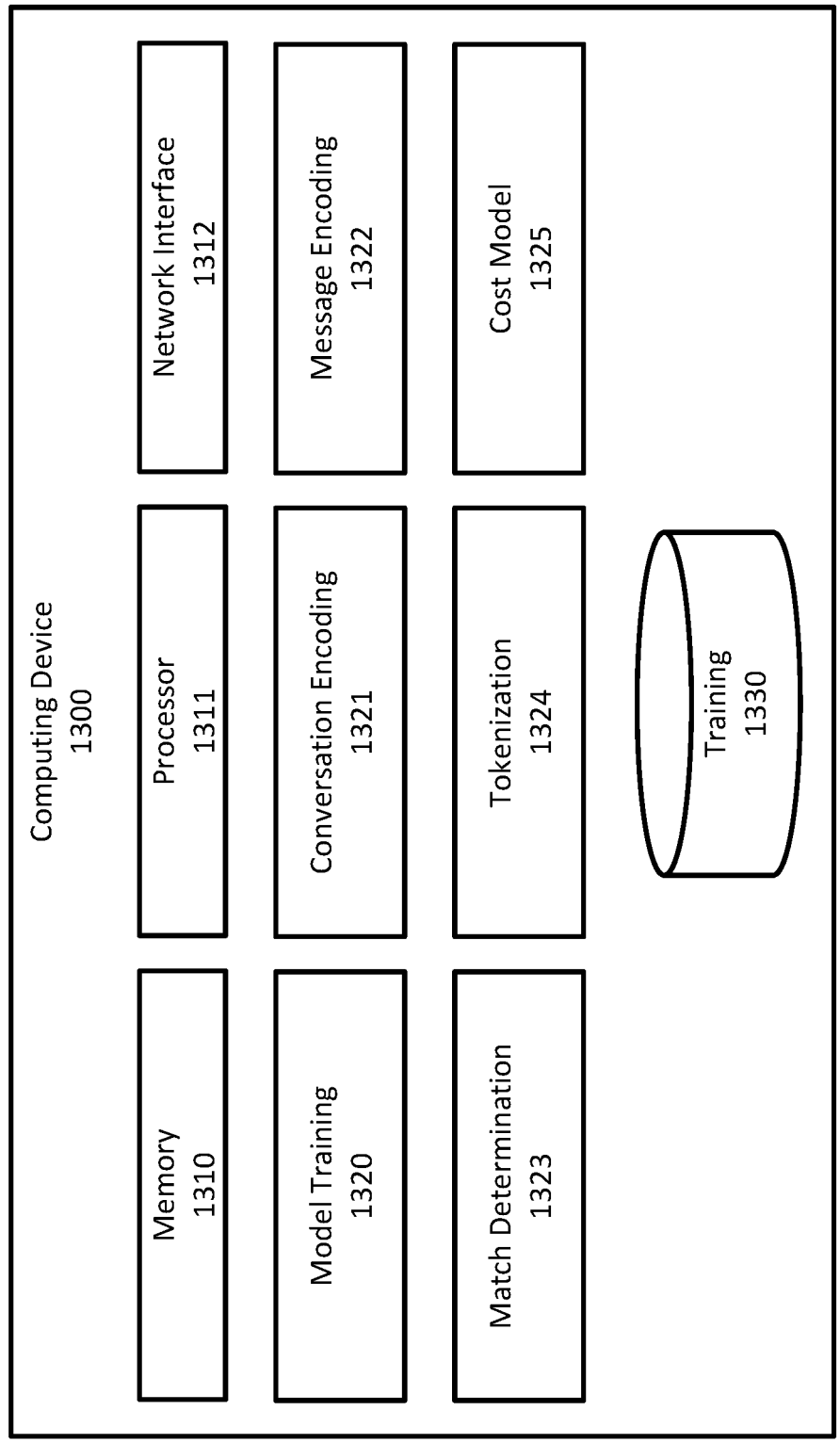
FIG. 13 illustrates components of one implementation of a computing device for implementing a conversation correction application.

FIG. 13 illustrates components of one implementation of a computing device 1300 for implementing any of the techniques described herein. In FIG. 13, the components are shown as being on a single computing device, but the components may be distributed among multiple computing devices, such as a system of computing devices, including, for example, an end-user computing device (e.g., a smart phone or a tablet) and/or a server computer (e.g., cloud computing).

Computing device 1300 may include any components typical of a computing device, such as volatile or nonvolatile memory 1310, one or more processors 1311, and one or more network interfaces 1312. Computing device 1300 may also include any input and output components, such as displays, keyboards, and touch screens. Computing device 1300 may also include a variety of components or modules providing specific functionality, and these components or modules may be implemented in software, hardware, or a combination thereof. Below, several examples of components are described for one example implementation, and other implementations may include additional components or exclude some of the components described below.

Computing device 1300 may have a model training component 1320 that may train any of the mathematical models described herein. Computing device 1300 may have a conversation encoding component 1321 that may compute a conversation encoding vector from one more conversation messages using any of the techniques described herein. Computing device 1300 may have a message encoding component 1322 that may compute a message encoding vector from an entered message using any of the techniques described herein. Computing device 1300 may have a match determination component 1323 that may compute a match score for an entered message using any of the techniques described herein. Computing device 1300 may have a tokenization component 1324 that may create a sequence of tokens from one or more text inputs using any of the techniques described herein. Computing device 1300 may have a cost model component 1325 that may compute a cost score using any of the techniques described herein.

Computing device 1300 may include or have access to various data stores. Data stores may use any known storage technology such as files, relational databases, non-relational databases, or any non-transitory computer-readable media. Computing device 1300 may have a training data store 1330 that stores training data that may be used to train the mathematical models described herein.

The methods and systems described herein may be deployed in part or in whole through a machine that executes computer software, program codes, and/or instructions on a processor. "Processor" as used herein is meant to include at least one processor and unless context clearly indicates otherwise, the plural and the singular should be understood to be interchangeable. Any aspects of the present disclosure may be implemented as a computer-implemented method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference in the entirety.

What is claimed is:

1. A system, comprising:
   at least one server computer comprising at least one processor and at least one memory, the at least one server computer configured to:
   receive one or more first conversation messages in a first conversation between a user and a first person;
   compute a first conversation encoding vector by processing the one or more first conversation messages with a neural network;
   receive one or more second conversation messages in a second conversation between the user and a second person;
   compute a second conversation encoding vector by processing the one or more second conversation messages with the neural network;
   receive an entered message entered by the user in the first conversation;
   compute a message encoding vector by processing the entered message;
   compute a match score indicating a match between the entered message and the first conversation by processing at least one of the message encoding vector, the first conversation encoding vector, or the second conversation encoding vector;
   compute a cost score, wherein the cost score indicates a harm from entering the entered message in an incorrect conversation;
   determine, using the match score and the cost score, to warn the user that the entered message may have been entered in an incorrect conversation; and
   cause a warning to be presented to the user.

2. The system of claim 1, wherein the at least one server computer is configured to:
   receive one or more third conversation messages between the user and a third person;
   compute a third conversation encoding vector by processing the one or more third conversation messages with the neural network; and
   compute the match score comprises processing the third conversation encoding vector.

3. The system of claim 1, wherein the at least one server computer is configured to cause the warning to be presented to the user by causing a dialog window to be presented to the user containing the warning.

4. The system of claim 1, wherein the at least one server computer is configured to:
   create an explanation for the warning; and
   cause the warning to be presented to the user by presenting the explanation.

5. The system of claim 4, wherein the at least one server computer is configured to create the explanation by comparing words of the entered message to words of the one or more second conversation messages.

6. The system of claim 1, wherein the at least one server computer is configured to compute the match score by processing non-text features.

7. The system of claim 6, wherein the non-text features comprise one or more of a number of messages in the first conversation, a duration of the first conversation, or an experience level of the user.

8. A computer-implemented method, comprising:
   receiving one or more first conversation messages in a first conversation between a user and a first person;
   computing a first conversation encoding vector by processing the one or more first conversation messages with a neural network;
   receiving one or more second conversation messages in a second conversation between the user and a second person;
   computing a second conversation encoding vector by processing the one or more second conversation messages with the neural network;
   receiving an entered message entered by the user in the first conversation;
   computing a message encoding vector by processing the entered message;

computing a match score indicating a match between the entered message and the first conversation by processing at least one of the message encoding vector, the first conversation encoding vector, or the second conversation encoding vector;

computing a cost score, wherein the cost score indicates a harm from entering the entered message in an incorrect conversation; and determining, using the match score and the cost score, to warn the user that the entered message may have been entered in an incorrect conversation.

9. The computer-implemented method of claim 8, wherein the first conversation encoding vector is computed by sequentially processing tokens of the one or more first conversation messages with a recurrent neural network.

10. The computer-implemented method of claim 8, wherein computing the message encoding vector comprises processing the entered message with a second neural network.

11. The computer-implemented method of claim 8, wherein computing the match score comprises processing the message encoding vector, the first conversation encoding vector, and the second conversation encoding vector with a classifier.

12. The computer-implemented method of claim 11, wherein the classifier comprises one or more fully connected neural network layers.

13. The computer-implemented method of claim 8, wherein computing the match score comprises computing an inner product of the message encoding vector and the first conversation encoding vector.

14. The computer-implemented method of claim 8, comprising:

computing the cost score by processing at least one of the entered message, the message encoding vector, or the first conversation encoding vector;

wherein determining to warn the user comprises using the cost score.

15. The computer-implemented method of claim 14, wherein computing the cost score comprises processing the entered message with a third neural network.

16. The computer-implemented method of claim 14, wherein determining to warn the user comprises comparing the match score and the cost score to a two-dimensional threshold.

17. One or more non-transitory, computer-readable media comprising computer-executable instructions that, when executed, cause at least one processor to perform actions comprising:

receiving one or more first conversation messages in a first conversation between a user and a first person;

computing a first conversation encoding vector by processing the one or more first conversation messages with a neural network;

receiving one or more second conversation messages in a second conversation between the user and a second person;

computing a second conversation encoding vector by processing the one or more second conversation messages with the neural network;

receiving an entered message entered by the user in the first conversation;

computing a message encoding vector by processing the entered message;

computing a match score indicating a match between the entered message and the first conversation by processing at least one of the message encoding vector, the first conversation encoding vector, or the second conversation encoding vector;

computing a cost score, wherein the cost score indicates a harm from entering the entered message in an incorrect conversation; and determining, using the match score and the cost score, to warn the user that the entered message may have been entered in an incorrect conversation.

18. The one or more non-transitory, computer-readable media of claim 17, wherein the user is a customer support agent for a company, the first person is a customer of the company, and the second person is a customer of the company.

19. The one or more non-transitory, computer-readable media of claim 17, wherein the actions comprise:

computing the cost score by processing at least one of the entered message, the message encoding vector, or the first conversation encoding vector;

wherein determining to warn the user comprises using the cost score.

20. The one or more non-transitory, computer-readable media of claim 17, comprising:

computing the cost score by processing at least one of the entered message, the message encoding vector, or the first conversation encoding vector; and selecting a warning presentation option using the cost score.

* * * * *